INVENTOR.
THOMAS O. MCCARTHY
BY
ATTORNEY

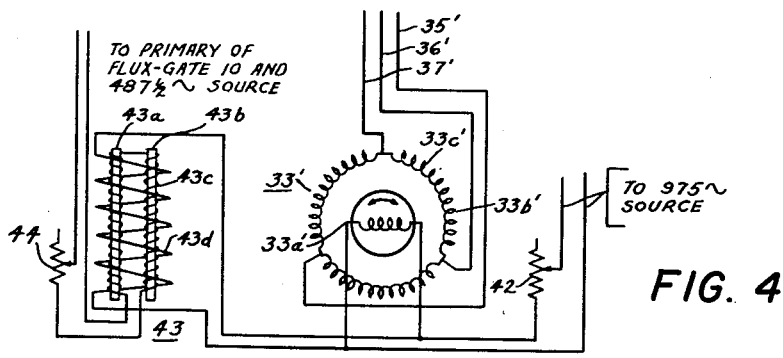
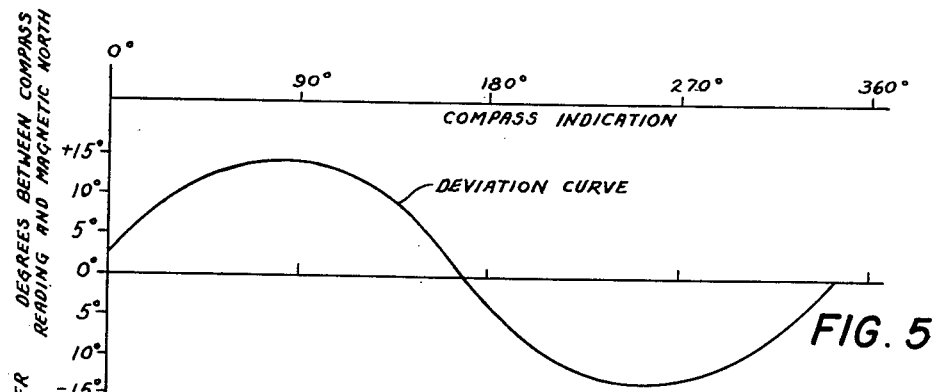
FIG. 5
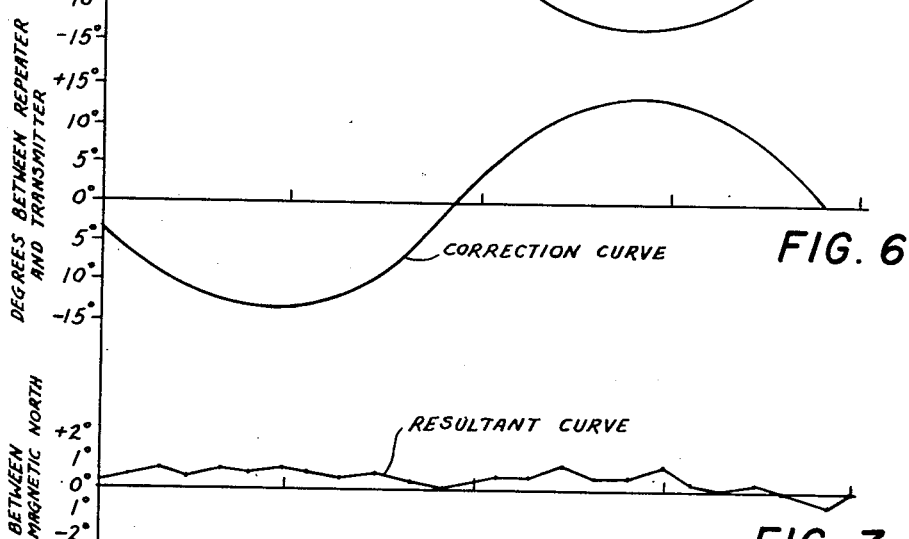
FIG. 6
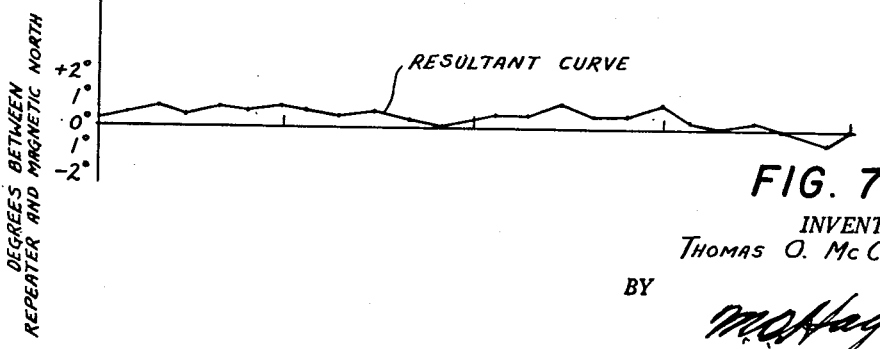
FIG. 7
INVENTOR.
Thomas O. McCarthy
BY
ATTORNEY Jan. 8, 1952     T. O'C. McCARTHY     2,581,436
MOTION TRANSMISSION SYSTEM Original Filed May 13, 1944     4 Sheets-Sheet 3

INVENTOR.
THOMAS O. McCARTHY
BY
ATTORNEY

Jan. 8, 1952     T. O'C. McCARTHY     2,581,436
MOTION TRANSMISSION SYSTEM
Original Filed May 13, 1944     4 Sheets-Sheet 4

INVENTOR.
THOMAS O. McCARTHY
BY
ATTORNEY

Patented Jan. 8, 1952

2,581,436

UNITED STATES PATENT OFFICE 2,581,436

MOTION TRANSMISSION SYSTEM

Thomas O'Connell McCarthy, Pawling, N. Y.

Continuation of application Serial No. 554,930, September 20, 1944, which is a division of application Serial No. 535,529, May 13, 1944. This application June 21, 1951, Serial No. 232,857

10 Claims. (Cl. 318—24)

(Granted under the act of March 3, 1883, as amended April 30, 1928; 370 O. G. 757)

This invention relates to electrical systems for transmitting angular motion that include a transmitter unit and one or more repeater units, and is a continuation of my copending application Serial No. 554,930, filed September 20, 1944, now abandoned, for Motion Transmission System. The said copending application is itself a division of my copending application Serial No. 535,529, filed May 13, 1944, abandoned. The subject matter of the abandoned application is disclosed and claimed in my copending application, Serial Number 104,122, filed July 11, 1949, as a continuation of the abandoned application.

A well-known type of such a system includes transmitter and repeater units which are usually alike and each comprises a single circuit field winding and a polycircuit armature winding, one of which constitutes a stationary element known as the stator and the other a movable element known as the rotor. The field windings of the transmitter and repeater are excited from a suitable source of alternating current and the respective armature windings are connected together.

These systems are used for many purposes and, under normal conditions, the repeater unit will follow the transmitter unit faithfully. In other words, motion of the transmitter through a 30° angle will cause the repeater to also move through a 30° angle in the same direction, and so on.

In certain applications of angular motion transmission systems, it is not desired to have the repeater follow the transmitter degree for degree. For example, in a remote reading compass system it is desirable to introduce a correction for the well-known compass errors. Likewise in direction-transmitting systems such as used in ordnance for target designation, the transmitted direction must be modified to allow for horizontal and for vertical parallax before the gun, range finder, or searchlight will point at the target being designated by the locator instrument. Similarly, in radio direction finders there exists an error that resembles a deviation error found in the compass art and that is, in fact, called a deviation error. This error can be corrected, compensated for, or removed so as to provide a direction indication that is approximately true. It will also be evident that there are many other installations incorporating direction-transmission systems where it is likewise desirable to provide a controllable asynchronous relation between the transmitter and repeater units.

The general object of this invention therefore is to provide a new and improved apparatus for effecting a controllable asynchronous relation between the transmitter and the one or more repeater units of an angular motion transmitting system.

Another object is to provide an apparatus of the type described wherein the amount of the asynchronism between the transmitter and repeater units varies as a function of the instant angular position of the transmitter unit.

A further object is to provide a new and improved electrical device for connection between the transmitter and repeater units of a synchro system wherein the normal synchronous relation existing between the rotor elements of these units is made asynchronous by an amount that varies as a desired function of the instant angular position of the rotor element of the transmitter unit relative to its stator element.

Another object of this invention is to provide an improved and automatic electrical compensator for angular motion transmission systems which is much less costly than the present known mechanical compensators and which is also exceedingly simple in construction and operation. Furthermore, through simple adjustment means, the character of the compensation effected by the device may be altered over a very wide range to provide practically any particular action required.

Another object is to provide a novel method of combining electrical and mechanical quantities.

These and other objects of the invention will become more apparent from the detailed description to follow and the accompanying drawings which show preferred embodiments of three applications for the invention, in which Fig. 1 is a diagrammatic view of the invention as applied to a flux-gate earth-inductor-compass system;

Fig. 4 is a diagrammatic view of a modified form of the electrical compensator shown in Fig. 1;

Figs. 5, 6 and 7 are plots of the deviation, correction and resultant curves for the apparatus in Fig. 1;

Fig. 9 is a plot showing typical bearing errors of the gun for two different target ranges which must be compensated for;

Figure 1:
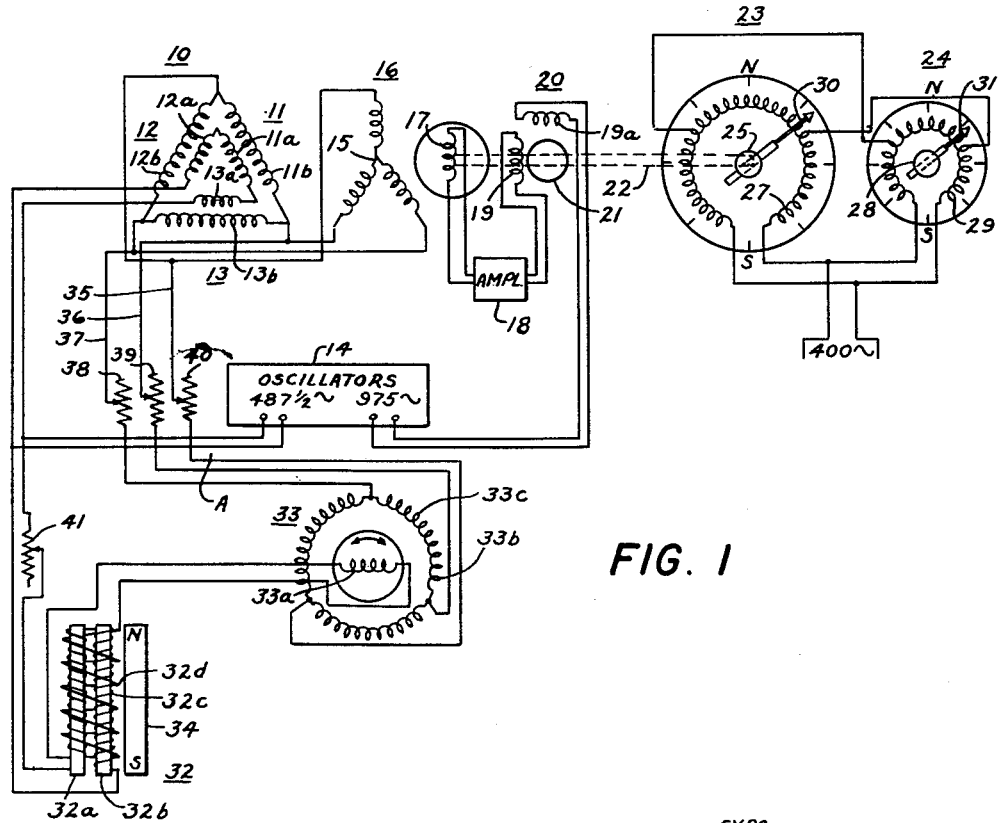

In Figs. 1-7, inclusive, there is shown diagrammatically an earth-inductor-compass system. A saturable core transformer, or flux-gate, indicated by numeral 10, consists of three legs, 11, 12 and 13, arranged to form an electrical equilateral triangle in space. All of these legs are of the same construction and each of them (see Fig. 2) such as leg 11 consists of a primary winding 11a, secondary winding 11b, and a pair of closely adjacent cores 11c and 11d.

Figure 2:
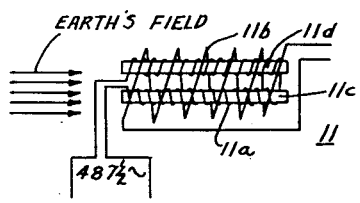
Fig. 2 is a view of the primary and secondary coil arrangement in one leg of the flux-gate.

As shown in Fig. 2, the primary winding 11a is divided, one-half being wound on core 11c and the other half on core 11d. The two halves of the primary are wound in opposite directions and they are thus noninductive. The primary winding 11a is excited from a source of alternating current which, in the present embodiment, has a frequency of 487½ cycles obtained from a suitable oscillator 14 of conventional design and therefore shown only in block diagram.

The primary windings 11a, 12a and 13a are designed to saturate their respective cores twice during each cycle, and for most of the cycle. During the saturation period there is, of course, no transformer action between the primaries and their associated secondaries. During each of the two unsaturated periods of the cycle, there is still no transformer action between the primary and secondary windings insofar as concerns the component of current in the primary from the 487½ cycle source since the two halves of each primary winding are wound in opposite directions. However, during each of the unsaturated periods, the earth's flux cuts through both halves of the core in the same direction and therefore induces a voltage in each secondary winding having a frequency of twice that of the primary, or 975 cycles.

Figure 3:
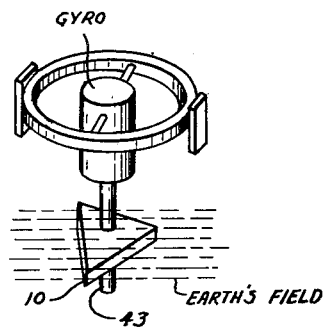
Fig. 3 is a perspective view of the gyro-stabilized flux-gate.

As shown in Fig. 3, the three legs of flux-gate 10 may be enclosed in a casing which is mounted in gimbals and stabilized by a gyro in order to maintain it horizontal in the earth's field.

The amplitude of each of the three voltages induced in the secondaries 11b, 12b and 13b will of course depend on their instant position relative to the direction of the earth's field. These voltages will therefore vary with the instant heading of the aircraft, vessel or other carrier upon which the flux-gate is mounted. As the compass is rotated in the earth's flux, the three voltages will vary in a manner similar to the voltage variations caused by movement of the rotor in a conventional synchro system.

It should be pointed out that the magnitude of the induced voltages in these secondaries, which are delta connected, is very small, being of the order of a few microvolts. Hence, it is necessary to connect the output thereof to a Y-connected stator 15 of a coupling Autosyn 16. The rotor element 17 of this Autosyn is provided with a single-circuit winding and the voltage induced therein by the currents in its poly-circuit stator windings is amplified in amplifier 18, of conventional construction, and transmitted to the variable-phase winding 19 of the two-phase stator element of a low-inertia induction motor 20. The other phase winding 19a of the stator is connected to the 975 cycle A. C. output terminals on oscillator 14. Induction motor 20 has a squirrel cage rotor 21.

Rotors 17 and 21 are mechanically coupled together by a shaft 22. Hence the voltages impressed upon the stator windings 19 and 19a of motor 20 will cause its rotor 21 and rotor 17 of motor 20 to rotate until the latter reaches its null position. Induction motor 20 is therefore a torque amplifier which turns rotor 17 to the position it would take were it able itself to develop the necessary torque.

From what has so far been described, it is seen that a change in angular position of the flux-gate 10 relative to the earth's field effects a like angular change in the position of rotors 17 and 21 and the shaft 22 connected therebetween. The flux-gate 10 is therefore analogous to the transmitter unit of a synchro or self-synchronous system and the motors 16 and 20 analogous to a repeater unit of such system.

For repeating the instant angular position of rotors 17 and 21, a second self-synchronous system is utilized and comprises a transmitter unit 23 and one or more repeater units 24.

The transmitter and repeater units are similar in structure although the repeater would normally be smaller than the transmitter if the latter is to drive a number of repater units.

The transmitter unit 23 includes a permanent magnet rotor 25 coupled to shaft 22 and a stator including a circular, laminated core. The stator has an exciting coil 27 wound upon it with a lead tapped off at each 120° point, thus making four leads altogether; two input leads and two tapped leads. The constants of the transmitting unit (the number of turns, value of exciting current, and magnetic alloy selected for the stator core) are chosen so that the stator core will be completely saturated twice during, and for most of, each cycle of its supply source which has a frequency of 400 cycles. During periods of saturation, no inductive effect can be produced within the core by the exciting current or the permanent magnet rotor. However, during each of the short unsaturated periods of the core, the rotor is free to produce an inductive effect upon it. During these periods, the rotor's magnetic flux flows through the core, and as it does so, induced voltages are superimposed in the stator winding. These voltages are at a frequency of 800 cycles since the stator core is rendered unsaturated for a short period twice during each cycle. The voltages across the taps of each of the three parts of the stator winding differ in value and vary with the instant position of the rotor 25 relative to stator winding 27.

As previously stated, the repeater unit 24 is similar to transmitter unit 23 and its rotor and stator winding are identified by reference numerals 28 and 29, respectively.

The stator windings 27 and 29 of the two units are connected in parallel and excited from the same 400 cycle A. C. source.

When the rotors of both units are in the same position relative to their respective stator windings, the three tapped voltages induced in the stator windings 27 and 29 will be alike. However, when the rotor 25 is rotated by shaft 22, the induced voltages in the stator winding 27 will differ from those in the stator winding 29 causing signal current to flow from winding 27 to winding 29 superimposed upon the excitation current. This flow of current produces a new resultant magnetic field flux in the stator winding 29 causing the rotor 28 of the repeater unit to rotate until it is in the same relative position to its stator winding 29 as the rotor 25 in the transmitter unit is to its stator winding 27. Accordingly, any angular displacement of rotor 25 by rotation of shaft 22 causes a like displacement of rotor 28.

It is now seen that as the bearing of the carrier for the flux-gate 10 changes relative to the earth's field, such bearing change will be fed electrically through the Autosyn coupling 16 and induction motor 20 producing an equal angular change in the position of shaft 22 and of the rotor 25 in the transmitter unit 23, which angular change may be indicated by a pointer 30. Transmitter unit 23 is then, in effect, a master compass. The position of pointer 30 may then be repeated by a pointer 31 on the rotor element of the one or more repeater units 24.

The earth inductor compass and all other types of compass systems depending upon the earth's magnetic flux for direct indications fail to indicate the true geographic north by the algebraic sum of the variation and deviation errors. Variation, which is the angle between the true or geographical and the magnetic meridian, is known for any given locality. The deviation is the total angle difference between the magnetic meridian and the indications of the compass system, and is caused by the magnetism of the vessel or other carrier upon which the compass system is carried.

The remote-reading earth-inductor-compass system which has been described is exceedingly practicable since the magnetically sensitive element (flux-gate 10) may be mounted so as to eliminate the effects of the unsymmetrical iron and steel of the compass carrier, such as are found in a vessel, and in a location where the effects of horizontal soft iron will be of a low value. When this condition is obtained, the deviation error is reduced to a factor, which, when plotted as an ordinate against compass indication as an abscissa, results in a curve having sinusoidal characteristics. A typical such curve is shown in Fig. 5.

In the earth inductor compass that has been described, the bearing indication on the transmitter unit 23 would, if not compensated, be in error by the algebraic sum of the variation and deviation errors. In this invention no compensation for variation is contemplated since this component of the total error is a constant for any particular latitude in which the compass carrier may be. However, one way for compensating the variation error would be to provide some means for shifting the rotor 25 of the transmitter relative to shaft 22.

However, this invention does provide an automatically operating and novel corrector or compensator which will substantially cancel out the deviation component of the total error.

As stated in the opening part of this specification, automatically operated deviation compensators presently known are of a mechanical nature and quite costly, and in no case do they alter the compensation to match the change in deviation error caused by displacement in magnetic latitude of the carrier. This invention substitutes an electrically operated compensator which is far more simple and less costly.

In particular, and with reference to Fig. 1, one form of my improved deviation compensator comprises a wave generator 32 and a control transformer device 33. The wave generator 32 consists of a flux-gate element which is similar to any of the three legs of device 10. That is, the generator 32 includes two cores 32a and 32b of a material having a high permeability with a primary winding 32c split between them, the two halves of this winding being wound on their respective cores in opposite directions so as to be non-inductive with respect to the secondary windings 32d which surrounds primary winding 32c.

Primary winding 32c is fed from the same 487½ cycle output terminals on oscillator 14 as the primary of flux-gate 10. However, wave generator 32 is designed to operate in the magnetic field of a permanent magnet 34, which is placed so as to provide a flux field of the proper intensity and direction. It should be stated by way of explanation that the earth's field is obviously also present in the cores 32a and 32b but its intensity, when compared to that of magnet 34, is so minute that it can be totally disregarded so far as operation of generator 32 is concerned.

Like flux-gate 10, the two cores 32a and 32b are saturated twice during, and for almost the entire period of, each cycle. However, during the two short periods in each cycle when cores 32a, 32b are unsaturated, the entry of the magnetic field from magnet 34 into these cores effects a transformer action to induce a voltage into the secondary 32d. The frequency of the voltage output from the secondary 32d will be twice that of the primary, or 975 cycles since the cores 32a, 32b are saturated twice during each cycle.

Transformer 33 includes a rotatable primary winding 33a and a core 33b which may be circular. A distributed secondary winding 33c is wound upon core 33b and tapped at the 120° points. The output from secondary winding 32d feeds the primary 33a. Consequently, when current flows in primary 33a, a voltage is induced in each of the three divisions of secondary 33c between the 120° tap points, the amplitude of each such voltage being dependent upon the particular angular position at which the rotatable primary winding 33a is set.

These three voltages which are the correction voltages to compensate for the deviation error are then connected into the electrical connections between the secondary windings 11b, 12b, 13b, and stator windings 15 of the coupling Autosyn 16 by means of conductors 35, 36 and 37 and series-connected variable resistors 38, 39 and 40.

In the system shown in Fig. 1, the primary winding 32c of generator 32 is excited at one-half the frequency of the voltage outputs from secondary windings 11b, 12b and 13b of the flux-gate 10. As this frequency is doubled by wave generator 32, the correction voltages from transformer 33 will be at the same frequency as the output voltages from secondaries 11b, 12b, and 13b. As the excitation for both flux-gate 10 and generator 32 is derived from the same source, oscillator 14, and transformer 33 is electrically coupled to generator 32, a fixed but controllable phase relationship exists between the deviation correction voltages and the output voltages from flux-gate 10.

It should now be apparent that if good compensation for the deviation component of the total compass error is to be obtained, correction voltages must be derived which, if applied to an earth inductor compass system without a compensator and located on a vessel or other carrier having no iron whatsoever, would produce a curve as shown in Fig. 6. Theoretically, this curve should be such that were it to be combined algebraically with the curve in Fig. 5, the net result would be zero error around the entire horizon. While the theoretically desired curve is possible, it has been found in practice that a correction curve which only approximates the contour of the deviation curve and will therefore produce the resultant curve such as that shown in Fig. 7 is satisfactory. Such a curve may be obtained by varying the position of the primary 33a relative to the secondary 33c associated therewith and making such adjustments as may be necessary in the settings of resistors 38, 39 and 40 in circuit with the secondary winding of transformer 33, and resistor 41 in circuit with the primary of generator 32. The points at which the correction curve crosses the base line can be adjusted by shifting the position of primary winding 33a and the amplitude of the curve is adjusted through resistors 38–41, inclusive.

In other words, as the heading of the carrier on which the compass system is installed changes through 360°, the only error will be that shown in Fig. 7 which is within the inherent error of the compass system.

It should be noted that once the correct position for the primary 33a of transformer 33 relative to its secondary 33c is adjusted for any particular compass installation, it need not be disturbed since it will automatically produce the right amounts of correction voltages required at any instant bearing throughout the 360° range.

As an alternative arrangement for introducing the compensation necessary to offset the deviation component of the total compass error, reference is now made to Fig. 4. Transformer 33' in Fig. 4 is similar to transformer 33 shown in Fig. 1, containing a rotatably adjustable primary winding 33a', core 33b' and a distributed 120° tapped secondary winding 33c', the 120° spaced components of secondary 33c' being connected in delta. If desired, winding 33a' may be made axially adjustable in accordance with the transformer structure disclosed in Fig. 10, to be described. However, in lieu of the wave generator 32 utilized in the arrangement shown in Fig. 1, excitation for the primary winding 33c' is obtained by tapping on to the 975 cycle output terminals of oscillator 14. A variable resistor 42 may be used in the circuit between the primary 33a' and the 975 cycle source to obtain any adjustment in current which may be necessary. The three output conductors leading from the taps on the secondary winding 33c' feed into the electrical connections between flux-gate 10 and the stator windings 15 of coupling Autosyn 16 in the same manner as shown in the arrangement in Fig. 1. These conductors have accordingly been identified in Fig. 4 by reference numerals 35', 36' and 37'. Resistor units similar to resistors 38–40, inclusive, in Fig. 1 may also be included in circuit with the conductors 35'–37', inclusive, but these have not been shown.

Also included in Fig. 4 is a wave generator 43 which is essentially similar to any of the three legs of the flux-gate 10. That is, generator 43 includes two cores, 43a and 43b of a high permeability material with a primary winding 43c split between them, the two halves of this winding being wound on their respective cores in opposite directions so as to be non-inductive with respect to each other and to the secondary. The secondary winding 43d is wound around the primary winding 43c.

The primary winding 43c of wave generator 43 is excited from the same 487½ cycle source as the three primaries of flux-gate 10 and may include a variable resistor 44 for making any changes in primary current which may become necessary. A variable resistor may also be used in the secondary 43d if desired.

Wave generator 43, in one form of the invention, may be maintained at all times in a vertical position with reference to the carrier, such as a ship. There is no permanent-magnet device present in wave generator 43 and hence the voltage induced in the secondary 43d is caused solely by the earth's magnetic field as modified by the carrier. As the carrier moves in latitude, the vertical component of the earth's field varies and thus a varying output potential from secondary 43d is obtained. This output is then connected in parallel with the primary winding 33a' of transformer 33' along with the other, and fixed, 975 cycle source. The arrangement shown in Fig. 4 works in substantially the same manner as that shown in Fig. 1 which has already been described in detail. However, in addition to providing the necessary correction for deviation at any one particular latitude, which is the result obtained by the arrangement shown in Fig. 1, the arrangement in Fig. 4, in addition, will also compensate automatically for changes in the deviation characteristic of the ship caused by changes in latitude. It will be noted that the vertical generator 43 supplies in this instance the same type of correction provided by the Flinders bar used in the magnetic-compass art.

Alternatively, device 43 may be fixed vertically with reference to the earth as by stabilizing it with a gyro. If this arrangement is used, device 43 may be fixed to the same gyro as flux-gate 10 in a manner shown diagrammatically in Fig. 3. In this position, device 43 acts somewhat in the manner of a Flinders bar to correct for changes in the vertical component of the earth's magnetic field with changes in latitude and may also compensate part of the heeling error.

As a further alternative arrangement, the three component parts of the distributed winding 33c' of transformer 33' may be Y-connected instead of connected in delta as shown in Fig. 4. Also the fixed 975 cycle source may be the wave generator 32 of Fig. 1.

In an actual correction problem the curve of compass deviation such as shown in Fig. 5 may be obtained by any of the standard well-known methods for the particular ship in which the compass system is to be installed. With this data available it is simple matter to make the necessary adjustments to the corrector circuits to remove the deviation from the system. Having determined, from the curve, the compass heading of the ship for (a) each null point and (b) the points of maximum amplitude, the ship is swung so as to be on the heading of a null, and the rotatable primary 33a or 33a' of the correcting transformer 33 or 33' is positioned so that there is no deviation in the compass system for this particular heading. The ship is then swung to the heading of a point of maximum deviation and the primary excitation of the corrector transformer is adjusted to remove all deviation; it will then be found that the deviation will have been removed or reduced to a small value for all headings of the ship. Should finer adjustment be desired a second swing of the ship may be made and the controls readjusted. Should the curve of compass variations be non-symmetrical, it may be necessary to adjust the resistances in the secondary leads from the corrector transformer, and/or impedance in the primary excitation circuit.

In a system including vertical wave generator 43, the relative amounts of voltage supplied by that generator and by the fixed source will be adjusted in such a manner that the proper change in total effect will be achieved for a certain change in magnetic latitude. This may be accomplished by making actual settings in the two different latitudes, or by artificial means approximating such changes.

Many ships encounter the necessity for compensating the compass under two widely different conditions. Examples are found in the use of de-gaussing coils, and in the loaded and unloaded state of a ship carrying a magnetic cargo, e. g., tanks. For such installations, I contemplate providing two separate compensating systems selected by a suitable switching arrangement.

As pointed out in the opening part of this specification, this invention may be applied to any self-synchronous angular-motion-transmitting system such as, for example, the direction-transmitting system used in ordnance installations in order to compensate automatically for the parallax error that exists between a target locating device such as a telescope and a remotely positioned instrument such as a range finder, searchlight or gun, where it is desired that the instrument shall always be brought to bear, or converge, on the target with the telescope.

Figure 8:
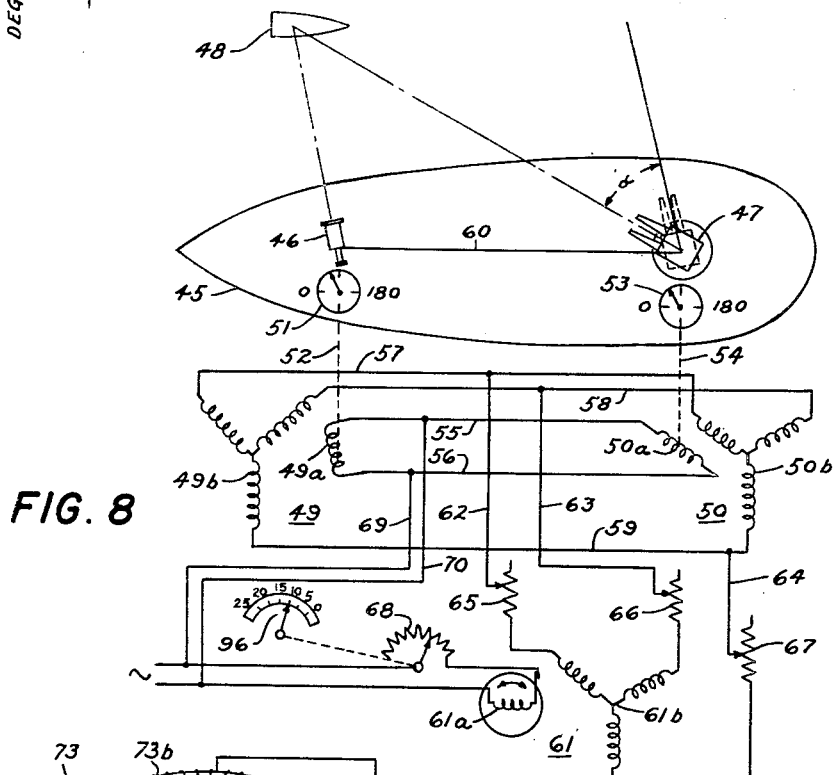
Fig. 8 is a diagrammatic view of the invention as applied to a gun director.

Fig. 8 is a diagrammatic view showing such an application on a ship 45 where the telescope or other locating device is identified by reference numeral 46, and the directed instrument, a remotely located gun turret identified by reference numeral 47. The target is indicated at 48. For transmitting target direction, a self-synchronous direction-transmitting system is utilized which may comprise a transmitter unit 49 and a repeater unit 50.

The transmitter unit consists of single-circuit field windings 49a, rotatably mounted, and a stationary Y-connected, polycircuit armature winding 49b, the three components of this latter winding being tapped at the 120° points. Of course, as previously explained in the opening part of this specification, the field and armature windings may be reversed, i. e., the armature winding may be the rotatable element and the field winding the stationary element. A master bearing indicator 51 is coupled to the rotatable winding 49a by suitable means such as a shaft 52 and the arrangement is such that rotation of the locating device 46 through any given angle effects an equal angular rotation of the pointer member of indicator 51, shaft 52 and winding 49a. Thus, as the telescope is rotated to bring it to bear on the target, the rotatable winding 49a shall also be moved through this same angle to thereby set up an unbalanced condition in the potentials across winding 49b.

The repeater unit 50 is similar to transmitter unit 49 and likewise includes a rotatable field winding 50a and a stationary, polycircuit armature winding 50b. An indicator 53 is connected to the rotatable winding 50a by means of a shaft 54. The rotatable windings 49a and 50a of the transmitter and repeater units are connected by conductors 55, 56 and the armature windings of these two units are connected together by means of conductors 57, 58 and 59.

In normal operation of a self-synchronous direction transmitting system, the rotatable element of the transmitter and repeater units are maintained in a synchronous relation so that any angular displacement in the transmitter unit effects an equal angular displacement in the repeater unit. However, in the described system, it is obvious from Fig. 8 that synchronous operation between the transmitter and repeater units is not desired due to the fact that the telescope 46 or other target locating device is usually located remotely from the directed instrument, such as the gun turret 47, this distance being represented in Fig. 8 by the base line 60. In other words, if the pointer in indicator 53 is kept in step with the pointer of indicator 51, gun turret 47, when set at the bearing indicated, would be off the target by the parallax error or angle $a$. Consequently, a correction must be applied to the repeater unit 50 so that the latter will rotate an additional or lesser amount, as the case may be, in order that the pointer of indicator 53 will indicate a direction such that when the gun turret 47 or other directed instrument is correspondingly set, it will be aligned on the target 48.

In present ordnance director systems, the necessary correction is applied through mechanically operated convergent devices, but these are quite complicated and costly. According to this invention the necessary correction may be applied electrically and the correction device connected into the three conductors that couple the armature windings of the transmitter and repeater units.

In particular, the correction device comprises a transformer 61 which includes a rotatably adjustable primary winding 61a, and a secondary winding 61b. Conductors 62, 63, and 64 connect the three components of the secondary winding 61b to the connections between the armature windings of the transmitter and repeater units through series connected rheostats 65, 66 and 67.

Excitation for the primary 61a of transformer 61 is obtained from an A. C. source of suitable frequency through a rheostat 68, this source also feeding the exciting current to the rotatable field windings 49a and 50a of the transmitter and repeater units, respectively, through conductors 69 and 70. A hand-setting arm 96 may be calibrated in units of range and kept set for the range to the target. This arm varies the value of the resistance of rheostat 68. Alternatively, arm 96 can be connected electrically or mechanically to the range-setting device on the range finder so as to keep the convergent corrector automatically set for the range.

Figure 9:
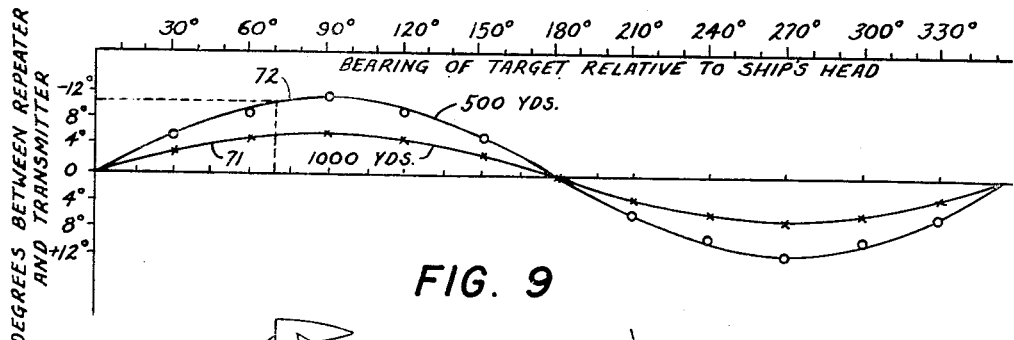

The characteristic of the correction necessary may be shown graphically by a curve as in Fig. 9. The amount of correction necessary to compensate for the parallax error will vary directly with the length of base line 60 and inversely with range. Typical correction curves for two such ranges are shown in Fig. 9; curve 71 is for a 1000 yard range, curve 72 for a 500 yard range. Thus, for a bearing of 70° relative to the ship's head, the correction to be applied to the pointer of indicator 53 for a target at a range of 500 yards would be approximately −10° 30′. The pointer of indicator 53 should then read 70° −10° 30′, or 59° 30′. For headings of 0° and 180° and assuming that the telescope 46 and gun turret 47 are aligned with the lubber's line of the vessel 45, the correction to be applied would be zero since there obviously is no error due to parallax at these two bearings.

In operation of the apparatus shown in Fig. 8, the particular correction curve necessary for any given range of the target 48 is obtained by setting the rotatable primary 61a of transformer 61 and properly adjusting the rheostats 65, 66, 67 and 68. Once set, no further adjustment is necessary.

In some applications of this invention, it may be desirable to obtain greater flexibility in generating curves than that offered by the single transformers 33, 33' or 61 shown in Figs. 1, 4 and 8, respectively. For example, it may be desirable to compound two curves of varying amplitude and frequency. This increased flexibility may be obtained by the arrangement shown diagrammatically in Fig. 10 wherein the correction transformer comprises a primary winding 73a and a pair of secondary windings 73b, 73c. Primary winding 73a corresponds with primary 33a of transformer 33 and is so supported that it may be rotatably adjusted in either direction and also vertically adjusted either up or down. The secondary windings 73b and 73c are similar in construction to the secondary winding 33c of transformer 33 except that one of them, 73b, is supported for rotation in either direction and also vertically adjustable, the other winding 73c being fixed in a given position. The three output leads at the 120° tapped points on the secondary windings 73b and 73c are connected in parallel and, for the compass application of the invention as shown in Fig. 1, would feed over conductors 35, 36 and 37 to the stator winding 15 of coupling Autosyn 16.

Figure 10:
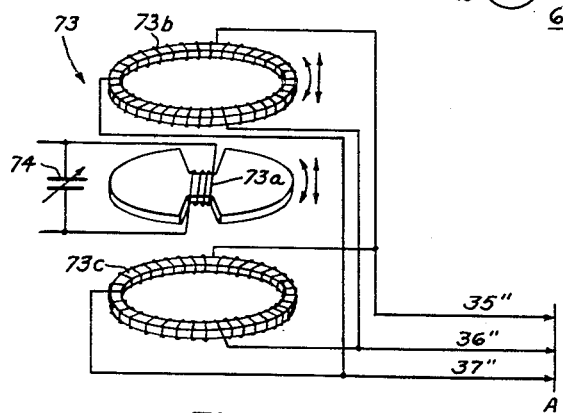
Fig. 10 is a view showing a still further modified form of compensator.

It is evident that the arrangement shown in Fig. 10 could be applied equally as well to any other self-synchronous transmission system and in such case conductors 35, 36 and 37 would be tapped into the connections between the armature windings of the transmitter and repeater units of the system. The secondary windings 73b and 73c may be either connected Y or delta.

Another means of controlling the shape of the correction curve would be to utilize phase-shifting devices in the primary circuit of the correction transformers such as the variable capacitor 74 shown in Fig. 10.

Still a third application for this invention is to a radio direction-finder system. The radio direction finder is a device used extensively in surface and air navigation to determine the bearing of a transmitting radio station from the ship or plane. In its simpler form it consists essentially of a rotatable loop antenna that can be turned in azimuth by the operator. The loop antenna is connected into a radio-frequency receiving set so as to provide an audible signal which, by properly turning the antenna, can be varied so as to produce a more or less sharp maximum or minimum volume of sound. When the minimum audio signal has been obtained, the relative bearing of the signal station can be determined by referring the position in azimuth of the antenna to a scale fixed in the ship or plane; and the true bearing can be obtained by referring the antenna direction to a scale fixed in space about a north and south line in a horizontal plane, such as a repeater compass operated by a gyro compass.

Due to the effects of the ship's structure, funnels, masts, hand rails, radio antenna, etc., the the indications of the radio direction finder are frequently in error by an amount that can be accurately determined for a given ship and transmitter frequency by a method of calibration in wide use. When the errors obtained by calibration are plotted as ordinates against the indicated direction as abscissa, a curve is obtained. Calibration curves of ships vary in amplitude and frequency but the quadrantal one illustrated in Fig. 12 is typical of curves that can be obtained.

Figure 11:
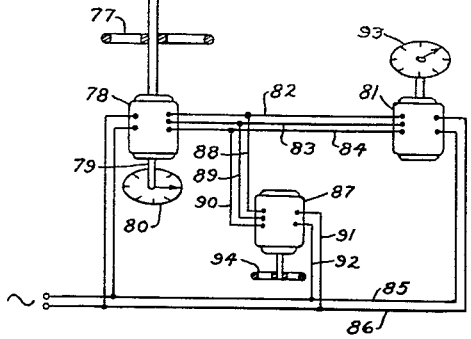
Fig. 11 shows an application of the invention to a radio direction finder.

The direction-finder system shown in Fig. 11 includes an antenna loop 75 supported by a shaft 76, the latter being mounted for rotation about its vertical axis by any suitable journal means, not shown. A hand-wheel 77 can be used for turning shaft 76 and loop 75. The rotor element of a self-synchronous transmitter 78 which may be similar in construction to transmitter unit 49 in Fig. 8 rotates with shaft 76, and the instant bearing of the loop 75 can also, if desired, be indicated by a pointer 79 on dial 80.

A repeater unit 81 having a bearing indicator 93, which may be similar in construction to the repeater unit 50 in Fig. 8, has its polycircuit armature winding electrically connected to the corresponding winding of transmitter 78 by conductors 82, 83 and 84. The rotatable field windings of the transmitter and repeater are connected by conductors 85, 86 and to a source of A. C. A corrector device 87 for effecting an asynchronous relationship between the transmitter and repeater units 79, 81 may be similar to the transformer device 61 in Fig. 8 and is similarly connected into the connection between transmitter and repeater by secondary conductors 88, 89 and 90. Primary conductors 91, 92 are connected to the field windings of transmitter 78 and repeater 81.

Figure 12:
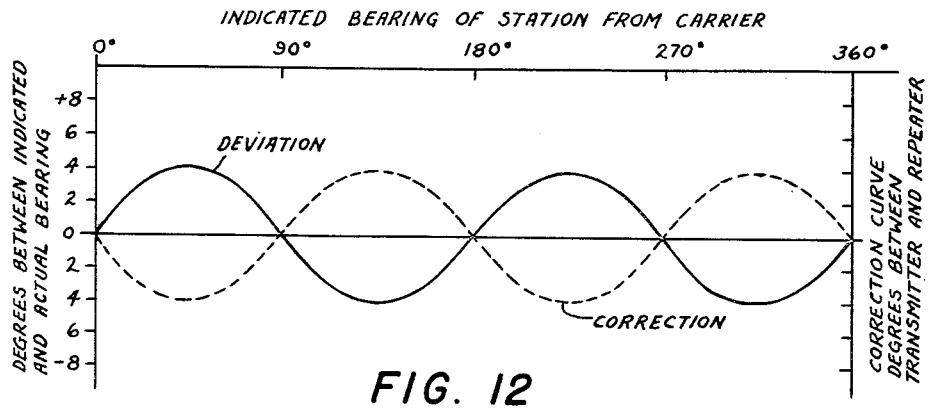
Fig. 12 shows a quadrantal deviation curve and correction curve therefor of a type that may be present in certain installations of a direction finder as shown in Fig. 11.

In a direct-reading radio direction finder where a direction-indicating device (dial 80 and pointer 79) would be directly connected to the antenna loop 75, the indicated reading on dial 80 would be corrected by applying the correction from the curve in solid line in Fig. 12.

However, in the installation shown in Fig. 11, the direction and movement of the antenna loop 75 are transmitted by the self-synchronous transmitter unit 78 to repeater 81 located remotely from the antenna-control mechanism.

Since the calibration or deviation curve shown in solid line in Fig. 12 is quadrantal in nature, correction voltages which would produce a quadrantal curve opposite in sign such as the curve shown by the broken line in Fig. 12 are necessary. One way that this can be accomplished is by setting the primary of the corrector transformer 87 to the proper position by turning handwheel 94 and/or adjusting resistances placed in circuit with conductors 88, 89 and 90, not shown.

Figure 13:
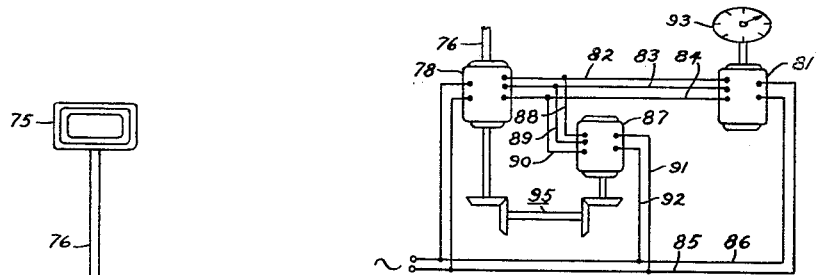
Fig. 13 shows a further arrangement for producing various correction curves.

Another means for producing the quadrantal correction curve is by causing the primary of the corrector transformer 87 to rotate relative to the seconday of this transformer as a function of the rotation of the transmitter 78. This arrangement can be effected through a suitable transmission 95 between the two rotor elements as shown in Fig. 13 which drives the rotor element of corrector transformer 87 at a 1-to-1 ratio with the rotor element of transmitter 78 but in an opposite direction. Furthermore, curve shapes and frequencies other than quadrantal can be obtained from the arrangement shown in Fig. 13 by changing the ratio or rotation of the rotors of transmitter 78 and transformer 87 and their relative directions of rotation.

In conclusion, I wish it to be expressly understood that while the foregoing illustrations of the invention represent preferred embodiments thereof, various changes can be made therein by those skilled in the art without departing from the spirit and scope of the invention as defined in the appended claim.

The invention described herein may be manufactured and used by or for the Government of the United States of America for governmental purposes without the payment of any royalties thereon or therefor.

Having thus fully described my invention, I claim:

1. A system for transmission of angular motion comprising a motion transmitting device having armature and field elements, a motion repeating device having similar elements, conductive connections between the armatures of said devices, and electrical means including an induction device having a pair of relatively movable windings, adjustable impedance means connecting one said winding to said conductive connections for cyclically modifying the voltages impressed upon the armature of said repeating device from the armature of said transmitting device in accordance with the instant angular position of said transmitting device.

2. The combination in claim 1 further comprising additional adjustable impedance means connecting the other said winding to a source of alternating potential thereby to control the amount of modification of said impressed voltages.

3. A system for transmission of angular motion, comprising a motion transmitting device having armature and field elements, a motion repeating device having similar elements, conductive connections between the armatures of said devices, and means for modifying the voltages impressed upon the armature of said repeating device from the armature of said transmitting device in accordance with the instant angular position of said transmitting device, said voltage-modifying means comprising a transformer having a primary and at least two secondaries movable relative to the primary, and means connecting said secondaries into the conductive connections between the armatures of said transmitting and repeating devices.

4. The system as in claim 1 wherein said voltage-modifying means is connected in shunt across said conductive connections.

5. In a system for transmitting angular motion, transmitter and repeater units each having field and armature elements, one of said elements in said transmitter and repeater units constituting the rotor thereof and said other element constituting the stator, means electrically connecting the armature element of the transmitter with the armature element of the repeater, means for impressing an alternating potential on the field elements of said transmitter and repeater units, whereby the rotor of the repeater unit normally follows the motion of the rotor of the transmitter unit, means including a transformer having primary and secondary windings adapted to be maintained in predetermined fixed relation to each other, one of said windings being coupled to said connecting means through adjustable impedance elements for applying a correction signal thereto, thereby to modify the potentials impressed upon the armature element of the repeater unit from the armature element of the transmitter unit as a function of the instant relative position between the rotor and stator elements of the transmitter unit, and means for independently adjusting said impedance elements thereby to alter the amplitude of said correction signal.

6. In a system for transmitting angular motion, transmitter and repeater units, each having field and armature elements, one of said elements in said transmitter and repeater units constituting the rotor thereof and said other element constituting the stator, means electrically connecting the armature element of the transmitter with the armature element of the repeater, means for impressing an alternating potential on the field elements of said transmitter and repeater units, whereby the rotor of the repeater unit normally follows the motion of the rotor of the transmitter unit, means including a transformer having primary and secondary windings adapted to be maintained in predetermined fixed relation to each other, one of said windings being coupled to said connecting means through adjustable impedance elements for applying a correction signal thereto, thereby to modify the potentials impressed upon the armature element of the repeater unit from the armature element of the transmitter unit as a function of the instant relative position between the rotor and stator elements of the transmitter unit, additional adjustable impedance means connecting the other of said transformer windings to a source of alternating potential for controllably adjusting the magnitude of the voltage impressed on said other winding.

7. In a telemetric system a transmitter and a receiver each having a rotatable member and a stationary winding, conductors interconnecting said windings whereby movement of the rotatable member of said transmitter is effective to cause a corresponding movement of the rotatable member of said receiver, and electrical induction means interposed in each of said conductors for effecting cyclic asynchronous operation between said transmitter and said receiver said last-named means comprising a rotary transformer having a stator, and adjustable impedance means connecting said stator across said conductors.

8. In a telemetric system, a transmitter and a receiver each having rotor and stator windings, one each of said windings of said transmitter and receiver being connected in a three-phase space relationship, a source of electric energy for energizing the other windings of said transmitter and said receiver, conductors interconnecting the corresponding windings of said transmitter and receiver whereby the rotation of the rotor windings of said transmitter is effective normally to cause a corresponding rotation of the rotor winding of said receiver, a transformer having its stator winding included in parallel with said conductors and having its rotor winding energizable from said source, variable resistance means in circuit with said transformer stator and said transformer rotor windings, and means for adjusting the rotor of said transformer to produce a cyclic asynchronous displacement of the rotor of said receiver.

9. In a telemetric system a transmitter and a receiver each having a rotor winding and three stator windings connected in a three-phase space relationship, a source of alternating current for energizing the rotor windings of said transmitter and said receiver, conductors interconnecting the corresponding windings of said transmitter and receiver whereby the rotation of the rotor windings of said transmitter is effective to cause a corresponding rotation of the rotor winding of said receiver, a rotary transformer having a rotor winding and a plurality of stator windings, variable resistance means connecting said stator windings to said conductors, and further variable resistance means connecting said rotor winding to said source.

10. A system for transmitting angular motion, comprising transmitter and repeater units, each having field and armature elements, one of said elements in said transmitter and repeater units constituting the rotor thereof and said other element constituting the stator, means electrically connecting the armature element of the transmitter with the armature element of the repeater, means energizing the field elements of said transmitter and repeater units, whereby the rotor of the repeater unit normally follows the motion of the rotor of the transmitter unit, means including a transformer having primary and secondary windings, one of said windings being coupled to said connecting means through adjustable impedance elements for applying a correction signal thereto, thereby to modify the potentials impressed upon the armature element of the repeater unit from the armature element of the transmitter unit as a function of the instant relative position between the rotor and stator elements of the transmitter unit.

THOMAS O'CONNELL McCARTHY.

No references cited.